United States Patent
Stewart et al.

(10) Patent No.: US 8,931,969 B2
(45) Date of Patent: Jan. 13, 2015

(54) SPECIALIZED KEYBOARD FOR ELECTRONIC DEVICES

(75) Inventors: Aaron M. Stewart, Raleigh, NC (US);
Hiroki Hirano, Fujisawa (JP); David W. Hill, Cary, NC (US); Mitsuo Horiuchi, Sagamihara (JP); Tomoyuki Takahashi, Fujisawa (JP); Kazuo Nakada, Sagamihara (JP); Go Osaki, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1178 days.

(21) Appl. No.: 12/412,453

(22) Filed: Mar. 27, 2009

(65) Prior Publication Data

US 2010/0247213 A1    Sep. 30, 2010

(51) Int. Cl.
*B41J 5/00*    (2006.01)
*G06F 3/02*    (2006.01)
*G06F 1/16*    (2006.01)

(52) U.S. Cl.
CPC ............ *G06F 3/0202* (2013.01); *G06F 1/1662* (2013.01)
USPC ............................ 400/489; 400/484; 400/486

(58) Field of Classification Search
USPC .................. 400/472–496; 361/679.08–679.2
See application file for complete search history.

(56) References Cited

U.S. PATENT DOCUMENTS

| | | | | |
|---|---|---|---|---|
| 5,059,048 A | * | 10/1991 | Sirkin | 400/486 |
| 6,005,496 A | * | 12/1999 | Hargreaves et al. | 341/22 |
| 8,297,861 B2 | * | 10/2012 | Wang et al. | 400/489 |
| 2004/0238710 A1 | * | 12/2004 | Hsu | 248/346.03 |

OTHER PUBLICATIONS http://www.peterkrantz.com/2006/vim-keyboard; published on Oct. 26, 2006.*
http://web.archive.org/web/20070423044001/http://www.peterkrantz.com/2006/vim-keyboard; archived on Apr. 23, 2007.*

* cited by examiner

*Primary Examiner* — Christopher Stanford
(74) *Attorney, Agent, or Firm* — Ference & Associates LLC

(57) ABSTRACT

The invention provides large, vertically elongated keyboard keys strategically chosen and positioned above the alphanumeric section of a standard keyboard (e.g. a laptop PC keyboard) to provide a more ergonomic keyboard arrangement. The invention provides for keys that appropriately address the needs of touch typists when striking frequently used keys located above the alphanumeric section of the keyboard.

8 Claims, 3 Drawing Sheets

SPECIALIZED KEYBOARD FOR ELECTRONIC DEVICES

FIELD OF THE INVENTION

This invention relates generally to keyboards for electronic devices such as laptop or notebook personal computers (a "laptop PC"). Specifically, the invention relates to specialized shapes, sizes and positioning of specific keys to achieve more ergonomic keyboard arrangements.

BACKGROUND OF THE INVENTION

Keyboards for electronic devices such as a laptop PC are typically designed for minimal space occupancy or footprint. This involves minimizing the overall size and width of the keyboard. As a result, editing and special function keys are often placed above the standard alphanumeric section of the keyboard (the alphanumeric section includes the main "QWERTY" typing section). Additionally, keys in this area are traditionally reduced in size in an effort to fit more keys and maintain an overall minimized keyboard footprint. Information on standard keyboard layout(s) is available at: International Organization for Standards (ISO-9241 and ISO-9995), www.iso.org.

Existing laptop PCs utilize variations in key location for non-alphanumeric keys (e.g. editing and function keys) appearing above the alphanumeric section of the keyboard. Laptop PC keyboards may utilize subtle variations in key size as well. However, the efforts to minimize the footprint of the keyboards in laptop PCs has led to problems encountered when users attempt to utilize certain keys. Keys placed outside of the alphanumeric section of the keyboard are often difficult to find and/or utilize.

Therefore, a need has been recognized for improving existing keyboard arrangements, particularly regarding non-alphanumeric keys of a laptop PC that are frequently utilized.

SUMMARY OF THE INVENTION

Broadly contemplated herein in accordance with at least one presently preferred embodiment of the invention are keyboard arrangements that facilitate the use of certain non-alphanumeric keys. It has been discovered that certain keys appearing above the alphanumeric section of the keyboard are frequently utilized. Examples of such keys that appear outside of the alphanumeric section of the keyboard but that have been discovered to be frequently utilized include the "Esc" (escape) key and the "Delete" (delete) key. For these frequently utilized keys, the distance from the alphanumeric "home row" (i.e. row of keys comprising keys "A"-"L" or ";"), tight spacing and incorrect key size often conspire to produce typing errors and/or a general reduction in ease of use.

Therefore, there is broadly contemplated herein, according to at least one presently preferred embodiment of the invention, a keyboard of an electronic device (e.g. a laptop PC) having keys positioned and sized to uniquely address the finger trajectory, the finger posture, and/or the hand and finger position that laptop PC users utilize when striking keys located above the alphanumeric section. At least one presently preferred embodiment of the invention employs large, vertical keys (large and vertical as compared to other keys—e.g. home row keys) positioned above the traditional alphanumeric section of a standard laptop PC keyboard. This ensures that the keys appropriately address the finger trajectory, posture, and position that laptop PC users utilize when striking keys located above the alphanumeric section of the keyboard, particularly during touch typing (i.e. typing without looking at the keyboard wherein the typist relies on established key locations and memory of these locations rather than looking at the keyboard for faster typing speeds).

In summary, one aspect of the present invention provides an apparatus comprising: a processor; a keyboard operatively coupled to the processor, the keyboard comprising: a main alphanumeric section; and a first vertically elongated key located above the main alphanumeric section and positioned on the keyboard to facilitate striking the first vertically elongated key with a flattened finger posture during touch typing.

Another aspect of the present invention provides an apparatus comprising: a processor; a keyboard operatively coupled to the processor, the keyboard comprising: a main alphanumeric section; and a first vertically elongated key located above the main alphanumeric section and positioned on the keyboard to facilitate striking the first vertically elongated key with a low key strike trajectory during touch typing.

A further aspect of the present invention provides an apparatus comprising: a processor; a keyboard operatively coupled to the processor, the keyboard comprising: a main alphanumeric section; and a pair of vertically elongated keys, the pair of vertically elongated keys comprising: a vertically elongated function key located above the main alphanumeric section and positioned on a left side of the keyboard; and a vertically elongated edit key located above the main alphanumeric section and positioned on a right side of the keyboard; wherein the vertically elongated function key and the vertically elongated edit key are positioned symmetrically relative to one another about a vertical and a horizontal axis that intersect at a central point of the main alphanumeric section.

Yet another aspect of the present invention provides an apparatus comprising: a keyboard comprising: a main alphanumeric section; and a first vertically elongated key located above the main alphanumeric section and positioned on the keyboard to facilitate striking the first vertically elongated key with a flattened finger posture during touch typing.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
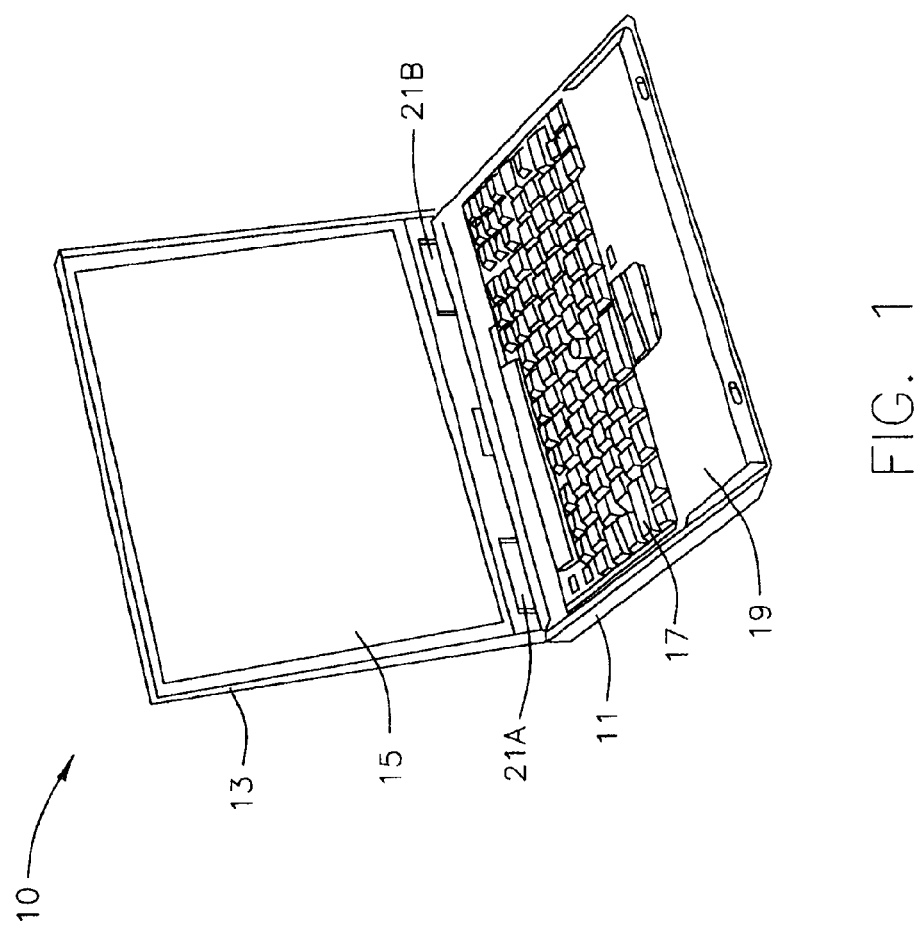
FIG. 1 depicts a high level view of a conventional electronic device (laptop PC).

For a better understanding of the present invention, together with other and further features and advantages thereof, reference is made to the following description, taken in conjunction with the accompanying drawings, and the scope of the invention will be pointed out in the appended claims.

It will be readily understood by those having ordinary skill in the art that the components of the present invention, as generally described and illustrated in the figures herein, may be arranged and designed in a wide variety of different configurations. Thus, the following more detailed description of the presently preferred embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided, such as examples of hardware, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected embodiments consistent with the invention as claimed herein.

It has been discovered through frequency of use analyses that certain keys appearing above the traditional alphanumeric section of a keyboard, such as a laptop PC keyboard, are frequently used. These keys include the "Esc" (escape) and the "Delete" keys. However, no laptop PC keyboard exists that uniquely addresses the finger trajectory and finger posture/position that laptop PC users utilize during touch typing when striking these frequently used keys located above the alphanumeric section of the standard keyboard.

Therefore, according to an embodiment of the present invention, large, vertical keyboard keys (elongated in a vertical direction) are strategically positioned above the traditional alphanumeric section of the keyboard. The size, orientation and position of these keys are mapped to the (low) approach trajectory of the finger and flattened finger posture used by keyboard touch-typists when reaching these keys (located in an area above the alphanumeric section of the keyboard). This achieves benefits such as increased comfort of key press (i.e. more key surface is provided) and reduced error rate (e.g. caused by missing the intended key or pressing an adjacent key).

In the past, larger, vertical keys implemented in keyboards have not taken into consideration the unique (low) approach trajectory, finger posture and/or finger position of the touch typist. That is, the trajectory of a key strike to a key located outside (e.g. above) of the main alphanumeric section (such as the escape and delete keys located a relatively far distance away from the home row) is much lower (i.e. less steep or at a lower angle) than for keys within or immediately next to the main alphanumeric key section. This in turn results in a flattened finger posture, as encountered when the typist does not move (or engages in limited movement of) the hand from the palm rest of a laptop PC.

Vertical keys placed to the left or right side of (e.g. immediately next to) the alphanumeric section of the keyboard (e.g. extreme near left or right side of the alphanumeric section) can cause the user to completely move the hand when pressing the key (to execute the key's function). In any event, utilization of these keys does not result in a lower or less steep trajectory and flattened finger posture. Large, vertical keys implemented in the alphanumeric section or immediately next to the alphanumeric section of the keyboard (e.g. UK English "Enter" key) do not adequately address the unique approach trajectory or finger/hand posture that would benefit from a vertical key shape, again because a lower or less steep trajectory and flattened finger posture are not required to strike these keys. In other words, the reasons for implementing vertically elongated key shapes above the alphanumeric section, according to the instant invention, are unique and different from conventional reasons for implementing vertical or large keys that may be placed immediately next to or within the alphanumeric section.

Accordingly, while not all edits/functions (and their associated keys) can be placed within the alphanumeric section (or immediately next to the alphanumeric section) of the keyboard due to size constraints of electronic devices, it has been discovered that touch typists frequently utilize some edits/functions. It is therefore desirable to make these frequently utilized keys more easily accessible, even though located outside (e.g. above) of the alphanumeric section due to size limitations. These commonly utilized keys that are located above the main alphanumeric section include, for example, the "escape" and "delete" keys, requiring substantial hand movement of the touch typist in order to properly strike.

Therefore, according to one embodiment of the present invention, non-alphanumeric edit and function keys (e.g. "Esc" and "Delete"), located outside of (e.g. above) the alphanumeric section of the keyboard, are provided in a large, vertical key configuration (vertically elongated). These larger, vertical keys are placed to the left and right side of the keyboard, above the alphanumeric section, to preserve their overall placement relative to other keys. Such a large, vertical key shape and positioning allows the user's hands to attain a position above the home row to strike these keys while remaining close to the home row for touch typing, with the comfort and accuracy needed and desired for easy use. Accordingly, the vertically elongated keys are strategically chosen and positioned to accommodate the trajectory, position and flattened posture utilized to execute these common functions and edits with no or minimal hand movement during touch typing.

According to an embodiment of the present invention, in addition to providing edit/function keys that have a large, vertical shape, an additional spacing is provided to the left and/or right of these keys. The additional space thus provided tends to further reduce error rates associated with touch typing on the keyboard and provides a natural visual grouping to the keys. The additional spacing promotes easy location of the keys, either visually or through touch. Additional spacing may also be provided between rows of keys, for example above the "fifth" row of keys (including "1"-"0" keys) and below the large, vertical keys, for the same effect.

The instant invention thus accommodates reduced accuracy in key strikes by strategically placing the large, vertical keys. The large, vertical keys are positioned (with or without the additional spacing) to minimize errant key strikes by taking into consideration the finger trajectory, the nature in which the finger(s) are extended, the flight path of the finger(s), and the positioning of the hands utilized in touch typing. The large, vertical key(s) ensure a finger trajectory used to strike the keys is more natural and comfortable for the user. A large, vertical shape has been discovered to be more advantageous than a large, horizontal shaped key at these positions in this regard. This is because the flattened posture, the finger trajectory, the flight path and the need to reposition the hand when reaching keys located a predetermined distance from the home row of keys is uniquely addressed by the strategic placement of a large, vertical key. Thus, use of a large, vertical key is presently preferred to a large, horizontal key for keys positioned above the alphanumeric section.

The instant invention reduces the need for the user to engage in a flattened hand posture (e.g. accomplished when extending the hand/finger) and readily accommodates such a flattened finger posture when it occurs, such that errant key strikes are avoided. This is particularly true in the case of the vertically elongated escape key (described below), as the boom of the escape key is positioned to occupy the sixth row, thereby reducing the flattened finger/hand posture. The vertically elongated delete key (described below) improves the sense of comfort and ease of use when a flattened hand posture is required for the key strike. The instant invention also reduces movements of the hand from a rest position (e.g. a palm rest position) when reaching the frequently utilized edit/function key(s). The instant invention also ensures that the flight path(s) of the user's finger(s) to the frequently utilized edit and/or function key(s) is as natural as possible, given the positioning of the keys outside of the alphanumeric section of the keyboard. That is, the large, vertical keys are appropriately sized and positioned to ensure the flight path(s) of the finger(s) naturally lead to a correct strike.

Referring now to the figures, at least one presently preferred embodiment will be described with reference to the accompanying drawings.

FIG. 1 depicts a high level view of a non-limiting and exemplary electronic device (10), a laptop PC in this example, in which it may be desirable to provide input from a keyboard. The laptop PC (10) contains a display casing (13) having a display medium (15) therein. The display casing (13) is connected via hinges (21a, 21b) to a system casing (11) of the laptop PC (10). The system casing (11) contains a keyboard arrangement (17) and a palm rest (19), as well as many of the functional components of the device (not shown). The keyboard arrangement (17) contains a plurality of keys for typing and executing a variety of functions. The improvements upon the conventional keyboard arrangement (17) are described further below.

Figure 2:
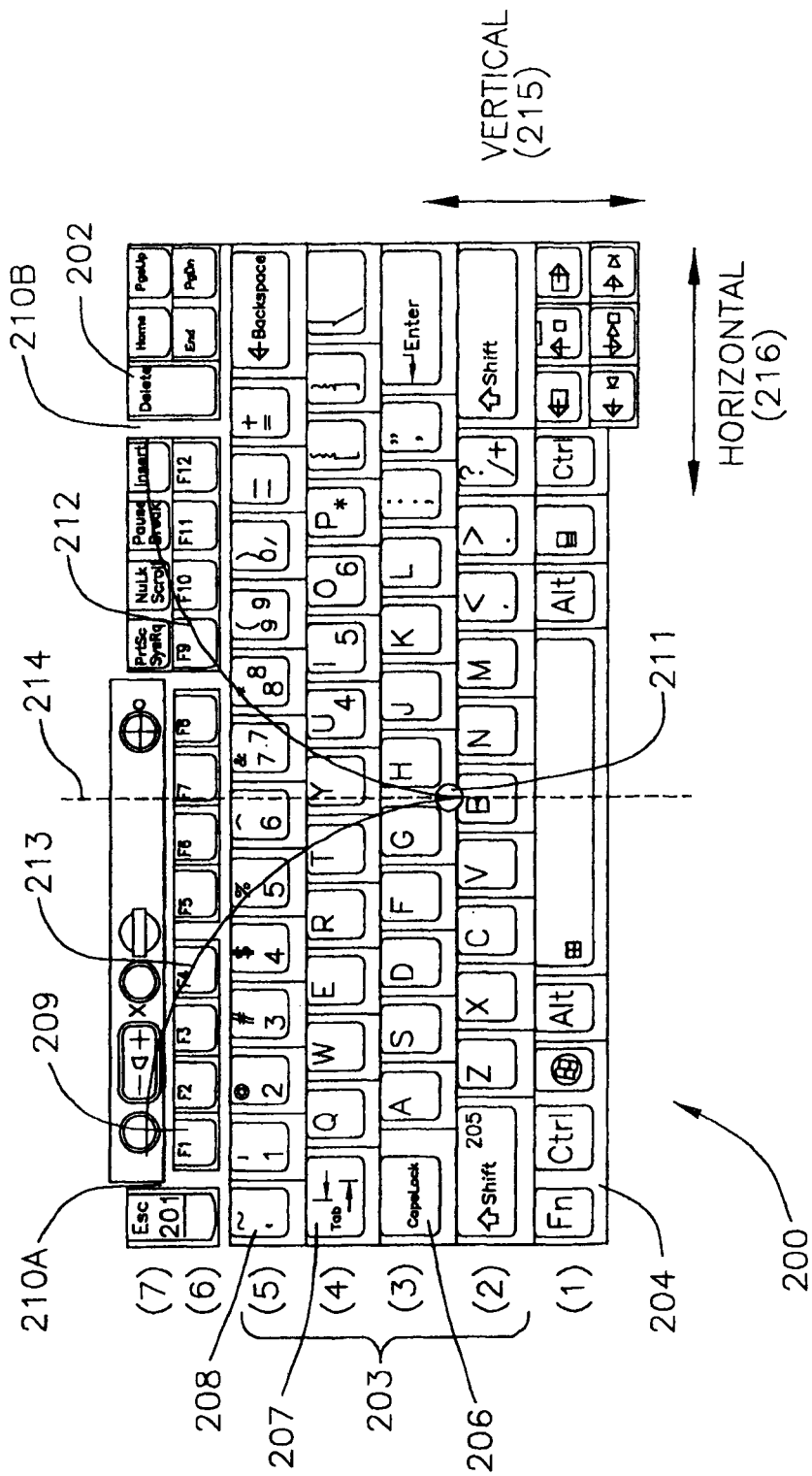
FIG. 2 depicts a keyboard arrangement according to one embodiment of the invention.

FIG. 2 depicts an embodiment of the present invention having large, vertical shaped edit/function keys (201, 202) placed above the alphanumeric section (203) of the keyboard (200). The keyboard (200) depicted comprises seven rows of keys (labeled 1-7). The first row (1) begins with the function key ("Fn") (204). The second row (2) begins with the "Shift" key (205). The third row (3) begins with the "Caps Lock" key (206). The fourth row (4) begins with the "Tab" key (207). The fifth row (5) begins with the "~" key (208). The sixth row (6), positioned to the right of the left-most edge of the keyboard (200), begins with the "F1" key (209). The seventh row (7) comprises buttons, also positioned to the right of the left-most edge of the keyboard (200).

It will be appreciated from FIG. 2 that according to one embodiment of the present invention, rather than the traditionally sized "Esc" (escape) key, a large, vertically elongated "Esc" (escape) key (201) (referred to herein also as a "function" key) is placed at the upper left most corner of the keyboard (200). The large, vertically elongated "Esc" (escape) (201) key extends to occupy both the "sixth" and "seventh" rows (6, 7) of the keyboard (200), located just above the "fifth" row (5) of keys (wherein the "fifth" row comprises the numeric keys "1"-"(0)" and associated keys). It should be noted that many laptop keyboards currently do not have seven rows of keys but rather employ six rows of keys. Thus, the vertically elongated keys of the instant invention, if implemented on a keyboard only containing six rows, would be implemented to substantially encompass the sixth row on a six-row keyboard and be of a larger (vertical) size compared to other keys appearing in the sixth row and/or keys in the alphanumeric section of the keyboard. Vertical (215) and horizontal (216) planes are indicated for reference on the keyboard. Thus "vertical" as used herein means vertical with respect to the vertical plane (215).

An embodiment of the present invention depicted in FIG. 2 provides a large, vertically elongated "Delete" key (202) located in an upper right position of the keyboard (200). According to an embodiment of the present invention, the large, vertical "Delete" key (202) occupies the "sixth" and "seventh" rows (6, 7) of the keyboard (i.e. the upper most rows of the keyboard as depicted in FIG. 2 such that the large, vertically elongated "Esc" (201) and "Delete" (202) keys occupy similar vertical positions on the keyboard (200)). The "Delete" key (202) is preferably positioned such that it occupies a space to the right of the large, vertically elongated "Esc" key (201), with twelve intervening function keys (i.e. F1-F12) located within the sixth (6) row of keys. According to an embodiment of the instant invention, the functional keys (F1-F12) have a reduced size and are positioned such that additional spacing (210a) can be provided to the right of the large, vertically elongated "Esc" (escape) key and additional spacing (210b) can be provided to the left of the large, vertically elongated "Delete" key (202).

As shown in FIG. 2, the large, vertically elongated "Esc" (201) and "Delete" (202) keys are located approximately equidistant from the TRACKPOINT (211) of the keyboard (200) such that arcs (212, 213) from the TRACKPOINT (211) to either of the keys (201, 202) are symmetric about a vertical axis (214) centrally located on the keyboard (200). This positioning ensures that the large, vertically elongated "Esc" key (201) is readily reached by a finger of the left hand and that a finger of the right hand readily reaches the large, vertically elongated "Delete" (202) key. This positioning also ensures that the vertically elongated keys (201, 202) can be reached with the respective fingers without a need for (or a reduced need for) the user to move the hand(s) from the palm rest (19) to reach the vertically elongated keys (201, 202). This positioning also ensures that the vertically elongated keys (201, 202) can be reached with the respective fingers without engaging in an overly flattened hand position, such as encountered when a user attempts to extend the reach range without moving the palm from the palm rest (19) of the device (10). This positioning also facilitates a more comfortable and natural finger trajectory and flight path when reaching the respective vertically elongated keys (201, 202) with the respective fingers.

It should be noted that, while the fine positioning of the vertically elongated "Esc" (escape) (201) and vertically elongated "Delete" (202) keys have been reconfigured, their overall position within the keyboard (i.e. upper left and upper right, respectively) has been maintained according to one embodiment of the instant invention. This ensures that the "muscle memory" of the touch typist is maximized—i.e. a touch typist will readily find the large, vertically elongated "Esc" (escape) (210) and "Delete" (202) keys in familiar positions, generally speaking. It should be noted that additional keys (e.g. the "Insert" key) have been repositioned so as to accommodate the extra spaces required for the large, vertically elongated "Esc" (escape) (201) and "Delete" (202) keys. These repositioned keys (e.g. "Insert" key) have also been strategically chosen because it has been found that certain keys (e.g. the "Insert" key) are less frequently used such that repositioning these keys will be less detrimental from the perspective of the touch typist.

Figure 3:
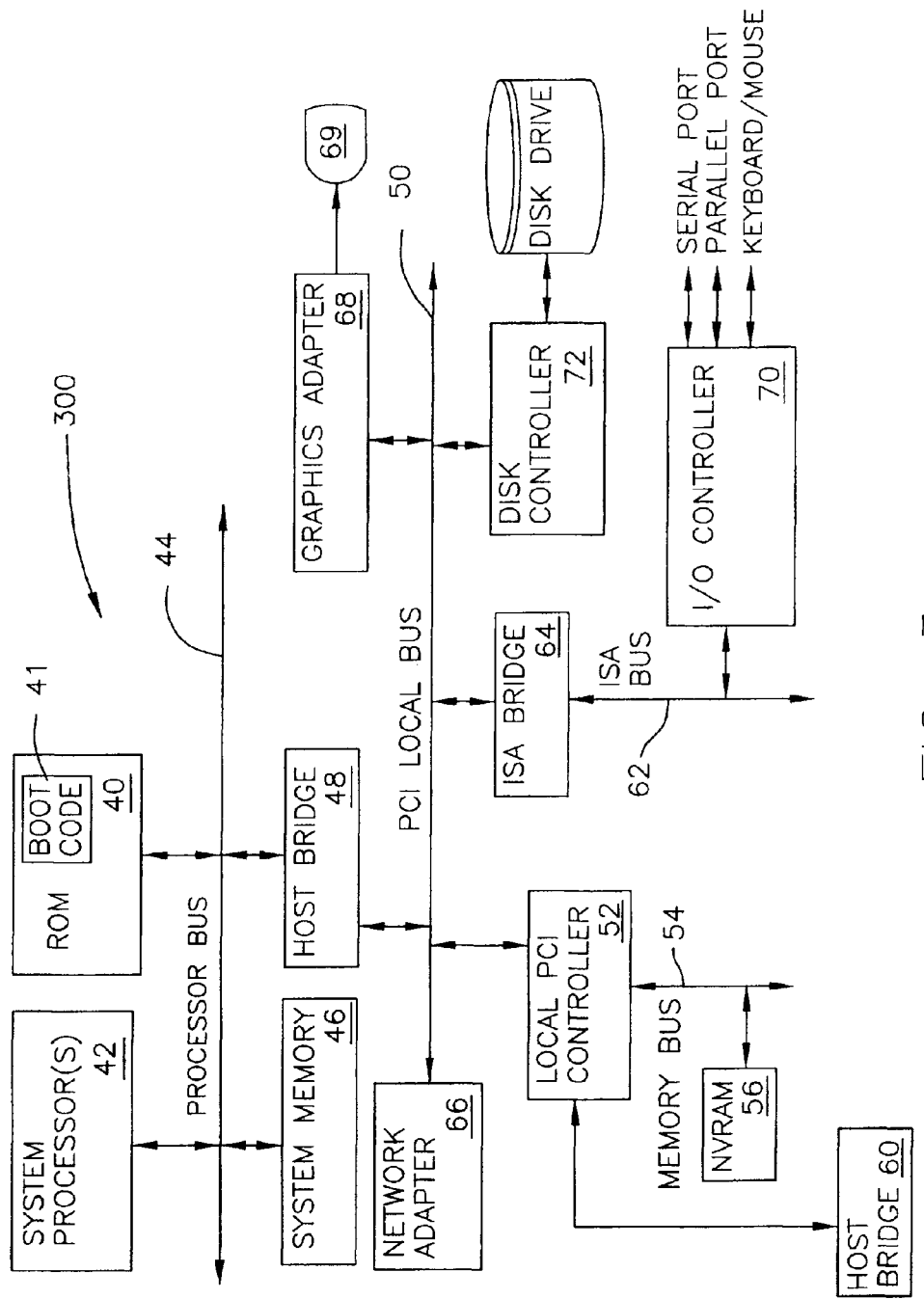
FIG. 3 is a block diagram of a computer system.

Referring now to FIG. 3, there is depicted a block diagram of an illustrative embodiment of a computer system 300. The illustrative embodiment depicted in FIG. 3 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As is apparent from the description, however, the present invention is applicable any data processing system or other electronic device that employs a keyboard as a user interface.

As shown in FIG. 3, computer system 300 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 300 to LAN 10, and graphics adapter 68, which interfaces computer system 300 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 300 further includes Industry Standard Architecture (ISA) bus 62, which is coupled to PCI local bus 50 by ISA bridge 64. Coupled to ISA bus 62 is an input/output (I/O) controller 70, which controls communication between computer system 300 and attached peripheral devices such as a keyboard, mouse, and a disk drive. In addition, I/O controller 70 supports external communication by computer system 300 via serial and parallel ports (e.g. to a keyboard as herein described, the keyboard being operatively coupled to the components of the system to enable a user to execute the functionality of the system). The USB Bus and USB Controller (not shown) are part of the Local PCI controller (52).

In brief recapitulation, at least one embodiment of the instant invention provides an electronic device, such as a laptop PC, with a keyboard having large, vertical keys strategically positioned such that the keys can be reached for easy touch-typing.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
 a processor;
 a keyboard operatively coupled to the processor, the keyboard comprising:
  a main alphanumeric section that includes a spacebar located in a lower portion thereof;
  a first vertically elongated key located above the main alphanumeric section; and
  a second vertically elongated key located above the main alphanumeric section; said first vertically elongated key and said second vertically elongated key being positioned on the keyboard to occupy upper corner positions relative to a central point of the main alphanumeric section;
  wherein said first vertically elongated key and said second vertically elongated key are positioned in approximately a same row orientation of said keyboard and have at least one non-vertically elongated key positioned there between.

2. The apparatus according to claim 1, wherein:
 the first vertically elongated key is a vertically elongated escape key; and
 the second vertically elongated key is a vertically elongated delete key.

3. The apparatus according to claim 1, wherein:
 the main alphanumeric section comprises four rows of keys;
 the keyboard further comprises:
  two rows of keys located above the main alphanumeric section; and
 wherein the first and the second vertically elongated keys are positioned within the two rows of keys located above the main alphanumeric section, the first and second vertically elongated keys being sized to encompass substantially an entire vertical length of the two rows of keys located above the main alphanumeric section.

4. The apparatus according to claim 1, wherein the first and second vertically elongated keys are positioned approximately equidistant from a centrally located vertical axis of the keyboard.

5. The apparatus according to claim 1, further comprising a system casing of a laptop computer, wherein the keyboard is housed within the system casing of the laptop computer.

6. The apparatus according to claim 2, wherein the keyboard further comprises:
 an additional space having no key positioned thereon located on a right side of the elongated escape key.

7. The apparatus according to claim 2, wherein the keyboard further comprises:
 an additional space having no key positioned thereon located on a left side of the vertically elongated function key.

8. A keyboard comprising:
 a main alphanumeric section; and
 a first vertically elongated key located above the main alphanumeric section; and
 a second vertically elongated key located above the main alphanumeric section; said first vertically elongated key and said second vertically elongated key being positioned on the keyboard to occupy upper corner positions relative to a central point of the main alphanumeric section;
 wherein said first vertically elongated key and said second vertically elongated key are positioned in approximately a same row orientation of said keyboard and have at least one non-vertically elongated key positioned there between.

* * * * *